United States Patent
Aubrey (12)

(10) Patent No.: US 6,614,427 B1
(45) Date of Patent: Sep. 2, 2003

(54) PROCESS FOR MAKING STEREOSCOPIC IMAGES WHICH ARE CONGRUENT WITH VIEWER SPACE

(76) Inventor: Steve Aubrey, 820 Willow St., Suite 3D, San Jose, CA (US) 95125

(*) Notice: Subject to any disclaimer, the term of this patent is extended or adjusted under 35 U.S.C. 154(b) by 0 days.

(21) Appl. No.: 09/495,613

(22) Filed: Feb. 1, 2000

Related U.S. Application Data

(60) Provisional application No. 60/118,316, filed on Feb. 1, 1999.

(51) Int. Cl.$^7$ ............................................. G06T 17/00
(52) U.S. Cl. ...................................................... 345/419
(58) Field of Search ........................................ 345/419

(56) References Cited

U.S. PATENT DOCUMENTS

| | | | |
|---|---|---|---|
| 6,175,371 B1 | 1/2001 | Schoulz et al. | 345/435 |
| 6,198,484 B1 | 3/2001 | Kameyama | 345/419 |
| 6,327,381 B1 | 12/2001 | Rogina et al. | 382/154 |
| 6,353,457 B2 | 3/2002 | Uomori et al. | 348/47 |
| 6,366,281 B1 | 4/2002 | Lipton et al. | 345/419 |
| 6,377,625 B1 | 4/2002 | Kim | 375/240.08 |
| 6,381,360 B1 | 4/2002 | Sogawa | 382/154 |
| 6,393,144 B2 | 5/2002 | Rogina et al. | 382/154 |

OTHER PUBLICATIONS

State et al., "Superior Augmented Reality Registration by Integrating Landmark Tracking and Magnetic Tracking", ACM SIGGRAPH, 1996.*

* cited by examiner

*Primary Examiner*—Almis R. Jankus
(74) *Attorney, Agent, or Firm*—Daniel L. Dawes; Myers Dawes Andras & Sherman LLP

(57) ABSTRACT

A process whereby a sequence of geometric transformations is applied to a three-dimensional data set so that the resulting stereogram has one image plane made congruent with one plane in the viewer's space. The image plane is usually, but not necessarily, the X-Z or ground plane of the image made congruent with some X-Z plane in the viewer's spatial environment, typically a desk top, table top or floor. When viewed from an angle of view and angle of regard which duplicates that used to create the stereogram, the resulting stereoscopic image appears as a virtual, erect, orthoscopic stereo environment whose X-Y-Z coordinates are congruent with the X-Y-Z coordinates of the viewer's space.

30 Claims, 5 Drawing Sheets

PROCESS FOR MAKING STEREOSCOPIC IMAGES WHICH ARE CONGRUENT WITH VIEWER SPACE

This application claims the benefit of Ser. No. 60/118,318, filed Feb. 1, 1999.

FIELD OF THE INVENTION

This invention relates to the creation and presentation of stereoscopic images.

BACKGROUND OF THE INVENTION

The present invention derives from a stereoscopic drawing process sometimes referred to as a phantogram. This is a public domain drawing procedure, usually done in two-color anaglyphic process, and dates from approximately the beginning of the twentieth century. Objects are drawn resting upon a horizontal image, or ground, plane, and have stereoscopic parallax and linear perspective applied to them while the ground plane itself remains rectilinear. The resulting stereogram is then placed flat on a desk in front of the viewer. The image is viewed obliquely at some angle, commonly 45 degrees down. When the viewer attains the proper viewing angle and viewing distance, the objects in the stereogram appear orthostereoscopic, properly proportioned, and apparently occupying the same X-Y-Z coordinate space as the viewers environment. The effect is quite palpable, almost holographic, prompting the viewer to attempt to touch and interact with the virtual objects.

The phantogram can be constructed through rigorous geometric plotting or by the use of commercially available grids. Phantograms have been most successfully used to illustrate spatially complex mathematical and geometric principles. Until now, this unique and relatively obscure approach to stereoscopic imaging has been limited to monochromatic line drawing. It would be useful to apply this approach to full-color, continuous-tone photography and photo-realistic, three-dimensional ("3D") computer graphics.

Most stereoscopic imaging and viewing systems, including binocular stereoscopes, projection devices, anaglyphic printing and CRT display, present the viewer with a 3D scene which may or may not correspond with his X-Y-Z coordinate space, usually not. That is, the angle and direction of regard of the imaging mechanism, be it photography or graphics, to the subject do not match the angle and direction of regard of the viewer to the resulting stereoscopic image. Objects commonly do not appear geometrically correct; they may be stretched or compressed along the viewing axis. Nor do they always appear to be the correct size. Additionally, if the imaging device describes the scene from one angle, say looking down, and the viewer regards the resulting stereo image horizontally, there is a lack of kinesthetic agreement. The compounding of these disagreements diminishes the effectiveness of the stereoscopic illusion, particularly if it is photographic or photo-realistic.

Through careful preplanning it is possible to display a stereoscopic image which is orthostereoscopic. That is, the angle of regard of the taking lens, in photography, or the lens of the virtual camera, in photo-realistic 3D computer graphics, exactly matches the viewer's angle of regard to the resultant stereoscopic image. Now all objects in the scene will appear geometrically correct. But even the more rigorous requirements of orthostereo do not guarantee that objects will appear correctly sized. Nor does orthostereo demand a correlation between the viewing direction of the taking mechanism to the subject and the viewing direction of the viewer to the stereoscopic image. Kinesthetic disagreement may still result.

When all parameters of the imaging process agree with all parameters of the viewing situation, the resultant stereoscopic image will appear geometrically correct, objects will appear correctly sized, and the imaging angle to the subject will be duplicated by the viewing angle to the resultant image. The X-Y-Z coordinate space of the image is now congruent with the X-Y-Z coordinate space of the viewer. This situation is sometimes referred to as tauto-orthostereo and yields the strongest possible stereoscopic illusion. It is also almost never accomplished in usual stereoscopic practice due to the extremely stringent demands on the imaging and viewing procedures.

The phantogram imposes strict geometric parameters on the imaging and viewing conditions as an integral part of its creation, and is therefore guaranteed by definition to meet almost all the necessary requirements to be tauto-orthostereoscopic. From this it obtains its ability to present a powerful stereoscopic illusion. It is, however, still flexible in the area of apparent object size. Objects may or may not appear at 1:1 scale. This is a matter for the practitioner to decide. If the subject is a house, for example, it would require an inordinately large image to describe the subject at 1:1 scale as the image must accommodate the subjects rectilinear ground plane at full size. For objects of more modest scale, a telephone, for example, the ground plane can easily be accommodated and the resulting phantogram will be truly tautoorthostereoscopic.

Unique and appealing as the traditional phantogram may be, it is still just a line drawing. It lacks color, shading, photo-realistic detail and a true sense of solid, three dimensional reality.

It is an object of the invention to provide a method of viewing a stereoscopic image which appears geometrically correct.

It is an object of the invention to provide a method of viewing a stereoscopic image where the objects in the image appear to be the correct size.

It is an object of the invention to provide a method of viewing a stereoscopic image where the X-Y-Z coordinate space of the image is congruent with the X-Y-X coordinate space of the viewer.

SUMMARY OF THE INVENTION

The objects of the invention are met by a process in which a selected plane in a digitized set of stereo images is processed to remove the several distortions imposed on the images by the taking lens. The processing involves: 1) removing convergence toward the horizon; 2) removing foreshortening; and 3) removing horizontal skew. In one embodiment, the resulting stereogram is presented such that the ground plane of one of the images is coincident with some horizontal plane in the viewer's environment. When the stereogram is viewed front an angle and distance which recapitulates that used in creating the stereo pair of images, an illusion of congruent depth results.

DETAILED DESCRIPTION OF THE INVENTION

Figure 1:
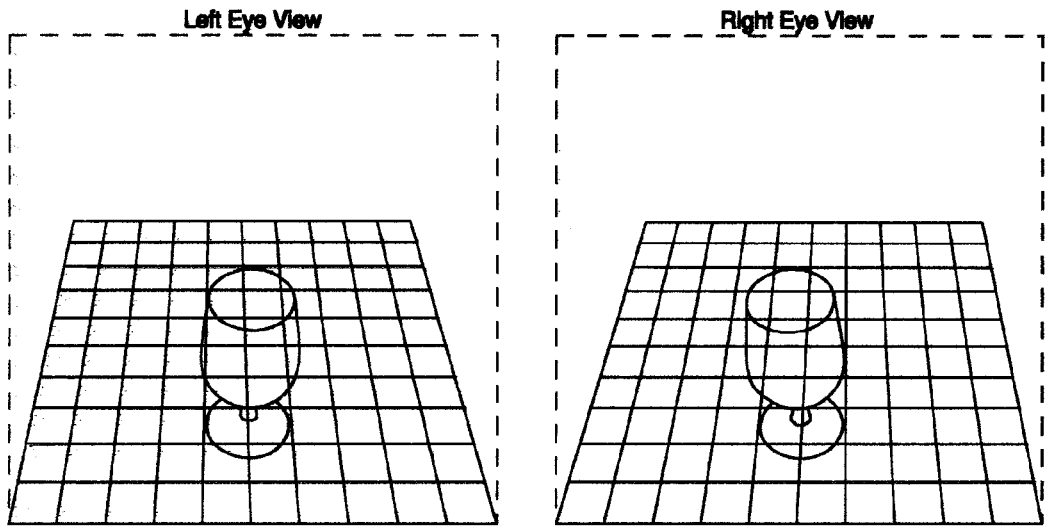
FIG. 1 is a pair of stereo images, each of the pair of images having a ground plane with the linear perspective imposed on the ground plane by the geometry of the taking lens.

The process disclosed here applies all the stereoscopic advantages of the phantogram line drawing to continuous tone 3D photography and photo-realistic 3D graphics for the first time. This concept may be applied to both photography and photo-realistic 3D computer graphics; however, for the purposes of the discussion below, only the process as applied to photographic images will be discussed.

As described above, the phantogram must be viewed at some specific angle. This angle is the same angle the camera looked at when the picture was taken. Commonly, this angle is 45 degrees. But it may be as much as plus-or-minus 30 degrees from this and still be fully successful. For purposes of this disclosure, a 45 degree look-down will be stipulated. Also stipulated will be a requirement that the subject be described at full 1:1 scale (tauto-orthoscopic).

The focal length of the taking lens is not critical, but it must be remembered that the viewer must eventually see the same angle of regard to the final image as the taking lens saw the subject. As a matter of viewing convenience, therefore, we will use a normal lens of 50 mm on a 35 mm camera.

Our camera will be mounted on a tripod equipped with a slide bar. This device will allow us to accurately move the camera between the left eye and right eye positions necessary for a successful stereo pair. This movement is precisely at right angles to the sight line of the camera lens. Because we have stipulated a 1:1 scale presentation of the subject, the camera movement must be equal to the average interocular distance of a human viewer. This is commonly accepted at 65 mm. We could be totally rigorous, however, and build the image for a specific viewer. Then the camera would be moved exactly that subject's interocular distance between left and right exposures.

The subject will be a drinking glass sitting on a checker board. After setting up the scene, the camera, mounted on slide bar and tripod, is arranged to look down on the scene at 45 degrees from horizontal at sufficient distance to fully accommodate the entire subject. The camera will also be arranged so the film plane is parallel to the near edge of the checker board and offset to the right one-half of the interocular from the center line of the subject. This will be the right eye exposure.

Shifting the camera to the left by the interocular distance, the left eye exposure is obtained. This provides the raw material for a photo-phantogram—a stereo pair of a subject taken at a look-down angle of 45 degrees with a normal lens and appropriate interocular distance.

Once the film images are obtained, they are scanned and digitized into high-resolution bit map digital flies. (A digital camera may also be used to obtain the images in which case the images are already digitized.)

The digital images are then geometrically altered to neutralize both photographic perspective and stereoscopic parallax in the ground plane, returning the images to their rectilinear condition. The perspective and parallax may be neutralized in one of two ways: 1) a sequence of algorithmic graphic transforms or 2) a procedure that reverses the photographic process in a 3D computer graphics program.

The actual algorithms for the transforms used to neutralize perspective and parallax is not the subject of this invention. Rather, it is the geometric transforms that the algorithms perform, i.e., the processing outcome, that is central here. Therefore, while these transforms are well-known in the prior art, being variously implemented in commercial image editing programs, the manner and combination in which they are used here to process the stereo pair of images is not known.

With reference to FIG. 1, the ground plane of the scene now reflects the linear perspective imposed on it by the geometry of the taking lens in that it: 1) converges toward the horizon, 2) is horizontally skewed by the parallax offset, and 3) is foreshortened toward the viewer. As mentioned above, some specified plane, commonly the ground plane, of a phantogram must be rectilinear.

The "convergence transform" is an inverse transform junction, derived from the geometry of the taking lens, which addresses point 1 (convergence toward the horizon) above.

Figure 2:
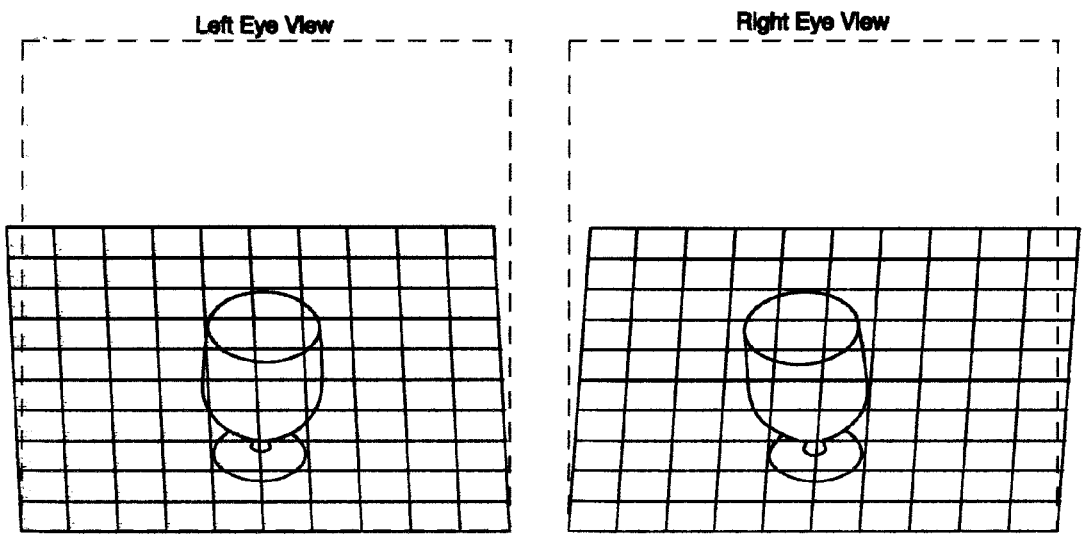
FIG. 2 is the pair of stereo images shown in FIG. 1 after the convergence transform has been applied to remove convergence and perspective in accordance with the invention.

FIG. 2 illustrates the result of the application of the convergence transform. The ground plane is now a parallelogram from which all perspective convergence has bean removed. The ground plane is still foreshortened and horizontally skewed. Additional transforms must now be applied.

Figure 3:
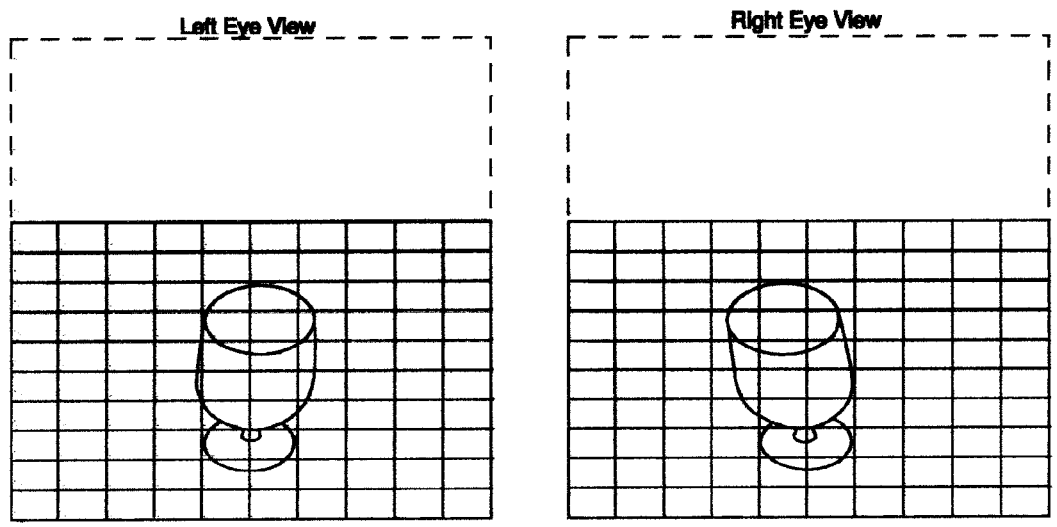
FIG. 3 is the pair of stereo images shown in FIG. 2 after the parallax transform has been applied to remove horizontal skew in accordance with the invention.

The "parallax transform" is an inverse transform function which addresses parallax, the horizontal skew produced by offsetting the camera position from the center line of the ground plane. This transform is derived from the magnitude and direction of the interocular offset and the geometry of the taking lens. FIG. 3 illustrates the result of the application of the parallax transform. The ground plane is now perfectly rectangular. We now have only to address the foreshortening of the ground plane.

Figure 4:
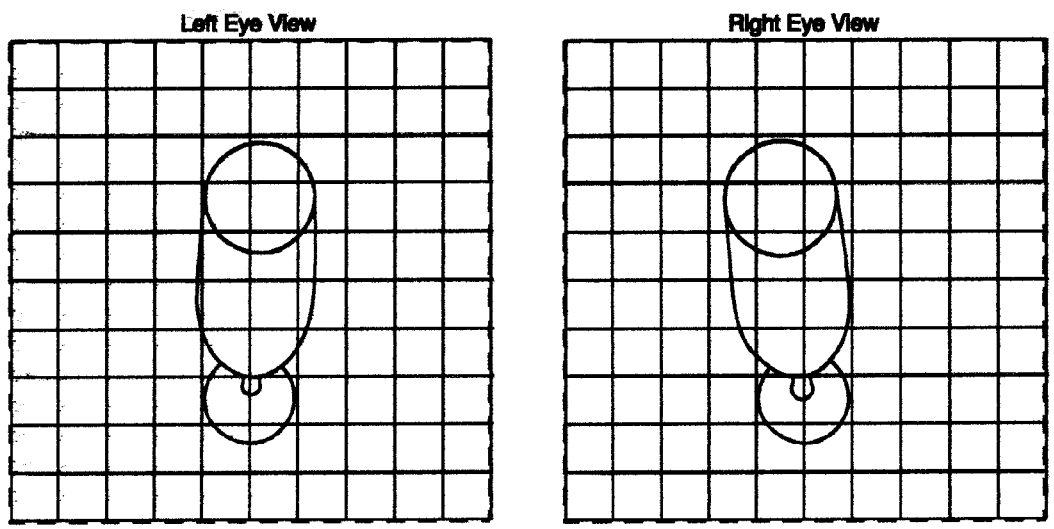
FIG. 4 is the pair of stereo images shown in FIG. 3 after the foreshortening transform has been applied to remove foreshortening in accordance with the invention.

The "foreshortening transform" is an inverse transform function which addresses the foreshortening of the ground plane. This transform is derived from the angle of view to the ground plane and the geometry of the taking lens. FIG. 4 illustrates the result of the application of the foreshortening transform. The ground plane is now completely restored again and satisfies the requirement of the phantogram that one plane be rectilinear.

This deconstruction of linear perspective, i.e., the application of the convergence, parallax, and foreshortening transforms, in the ground plane is carried out for both the left and right eye images.

Figure 5:
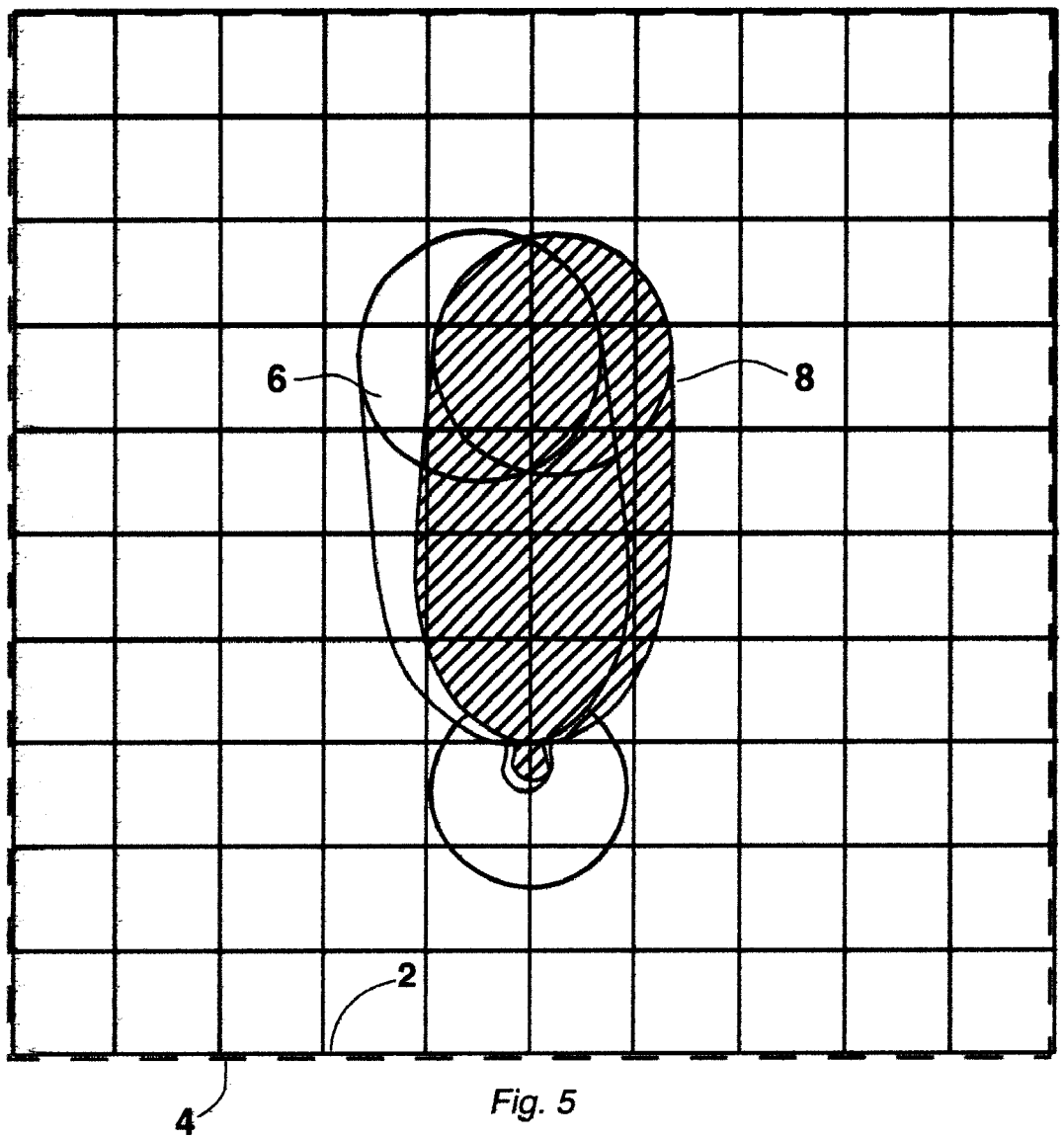
FIG. 5 is the pair of stereo images shown in FIG. 4 wherein the ground plane of the left and right eye images are presented with their ground planes perfectly coincident.

A second approach may be used to remove linear perspective from the stereo images. This second approach requires replicating the photographic setup used to create the images exactly in a 3D computer program. The stereo images are then projected back onto the ground plane from the position and angle of the respective left and right camera positions. This procedure is called projective mapping and effectively undoes the perspective foreshortening and parallax skew in the image of the ground plane, returning the ground plane to its original shape. The results of this approach are shown in FIG. 5. Regardless of which procedure is used to remove linear perspective, the ground planes in both the left and right eye images are now identical. Whichever stereoscopic delivery system is chosen for final viewing of the photophantogram, the registration alignment of the images must satisfy the same requirement: the left and right eye images must be presented with the specified planes perfectly coincident. This will stereoscopically present the ground plane, in this example, as coincident with the 3D picture plane, as shown in FIG. 5. Here, the right eye image 2 is combined with the left eye image 4; the images' 2, 4 ground planes are coincident. When this stereoscopic image is viewed correctly (see below), the right eye image of the glass 6 and the left eye image of the glass 8 will combine to give the illusion of depth. When the picture plane in turn is made coincident with some horizontal plane in the viewer's environment, eg., a desk top, the result will, be congruency between the X-Y-Z coordinate space of the photo-phantogram and the X-Y-Z coordinate space of the viewer.

Figure 6:
FIG. 6 shows a common situation for viewing a photo-phantogram where the viewer is seated at a desk with the photo-phantogram resting on top of the desk.

The process of rendering the X-Z ground plane rectilinear has anamorphically stretched the information in the X-Y plane. In order to optically compensate for this linear distortion, the photo-phantogram must be viewed from an angle and distance which recapitulates that of the original taking lens. FIG. 6 illustrates a common viewing situation: the viewer is seated at a desk upon which is resting the photo-phantogram. For purposes of this illustration we will assume that the image has been printed as a full color anaglyph.

The viewer arranges the image on the desk top such that it can be viewed from a look down angle of 45 degrees and centered to the viewers lines of sight. In practice, the viewer is strongly guided to the proper viewing angle and distance by the stereoscopic content of the image itself. Even slight deviations from the appropriate viewing angle and distance result in obvious geometric distortions of the subject. Once the proper viewing angle and distance to the image is achieved, the stereoscopic content of the image will be tauto-orthostereoscopic. The subject will appear to be resting on the desk top, geometrically correct, and fully immersed in the viewer's own X-Y-Z coordinate space.

Figure 7:
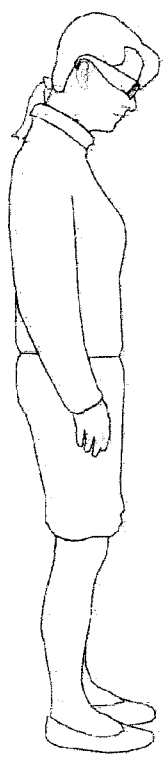
FIG. 7 shows one possible embodiment for viewing large images in accordance with the invention.
Figure 7:
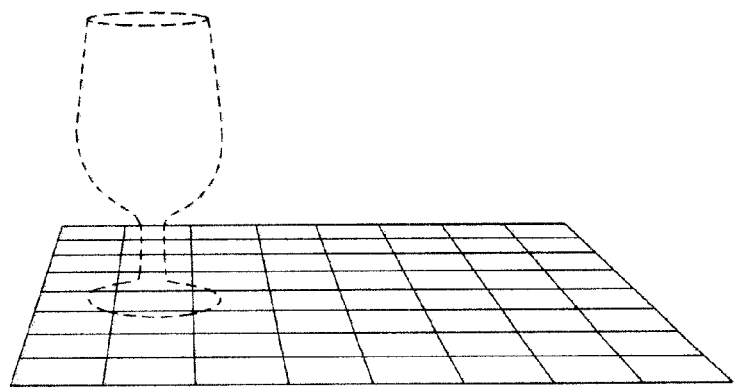

The viewing situation described above is appropriate for images of modest size. Other stereoscopic viewing techniques may be employed, including: anaglyphic printing and projecting, both full-color and two-color; vectography, both full-color and monochrome; polarized projection of slides, video, or other projection techniques, e.g., opaque projection; any of several stereoscopic CRT techniques, including alternating field arid lenticular autostereoscopy; holography; and lenticular stereography. For larger images to be viewed, e.g., in a museum environment, the viewer could be standing. In the case of an anaglyphic presentation, the necessary viewing glasses could be arranged at a viewing stand already positioned at the appropriate location. FIG. 7 shows one possible embodiment.

Figure 8:
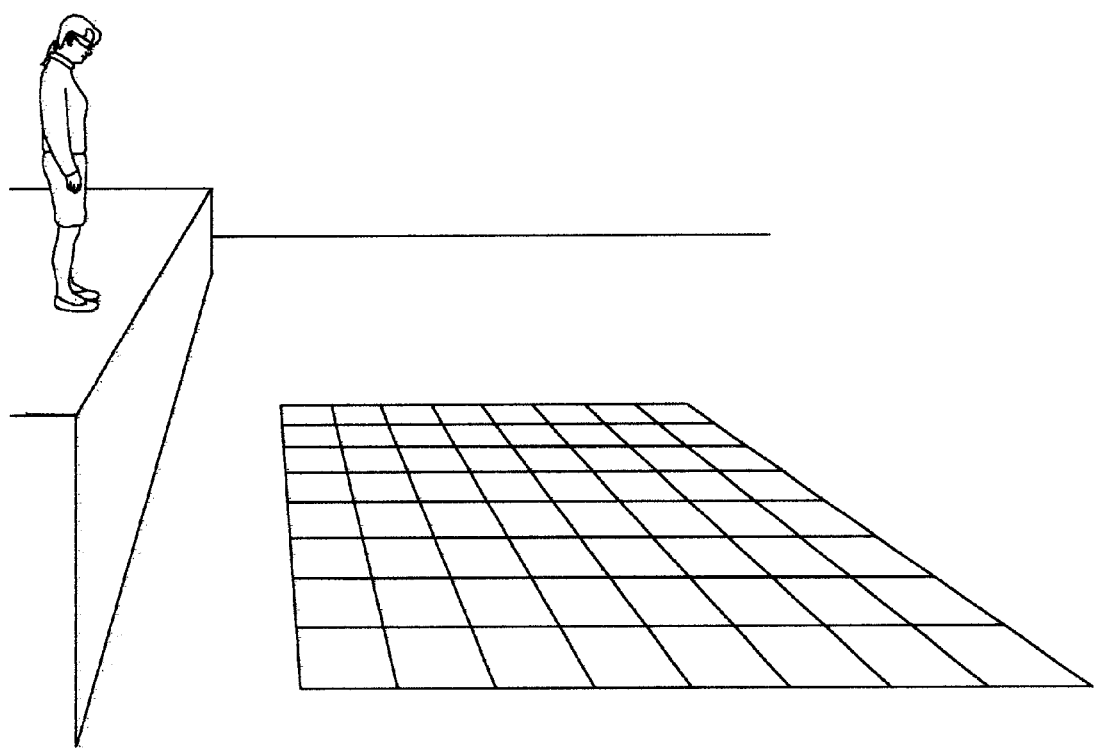
FIG. 8 shows another possible embodiment for viewing very large images in accordance with the invention.

Very large photo-phantograms can be accommodated in several ways. The first approach is to continue to increase the distance between the viewer and the image, as suggested in FIG. 8. In the second approach, one can use a wider angle lens when producing the original stereo views. This will allow for a relatively shorter viewing distance than that of an image created with a normal lens as described above. Finally, the image can be geometrically projected onto a second or even third plane at some angle to the ground plane. When the horizontal portion of the image comes to an end, it can continue unbroken on the adjoining plane or planes. The image can be geometrically projected onto a second or even third plane at some angle to the ground plane. When the horizontal portion of the image comes to an end it can continue unbroken on the adjoining plane or planes. This situation must be anticipated and accommodated by projective mapping in the 3D reversal process.

Historically, the phantogram has been constructed with the X-Z ground plane as the matching plane to the viewer's X-Y-Z coordinate space. There is no reason why this must always be so. The Y-Z or X-Y planes, or some diagonal combination of these, planes can also be selected if the subject is more properly associated with these planes. Similarly, the X-Z plane need not be the ground plane. If the subject is a chandelier, the ground plane could just as well be the ceiling plane.

If maintaining 1:1 scale for the subject is not critical, there is no limit to the size of the object described. The photophantogram can be used with aerial photography to produce a geometrically accurate, though miniaturized, virtual city on a desk top. In this hyperstereo situation, the interocular distance will be the inverse of the scale of reduction. To describe one square mile of landscape on a 12 inch square image, the normal interocular would be multiplied by 5280, resulting in an aerial spacing of the left and right eye points of view of 33.5 meters. The proper viewing distance would then be the oblique camera-to-scene distance at the time of photography divided by 5280.

Similarly, a microscope could be the taking device, in which case the above situation would be inverted; the interocular distance would be reduced in inverse proportion to the magnification of the subject while the viewing distance would be multiplied.

What is claimed is:

1. A method of creating and viewing a stereoscopic image comprising:
    a) creating a digitized set of at least two images;
    b) geometrically altering each individual image such that a selected plane in each of the pair of images is rectilinear;
    c) presenting the stereoscopic image wherein the selected plane of one of the images is coincident with the other images; and
    d) viewing the stereoscopic image from an angle and distance which recapitulates that used in creating the stereo pair of images, wherein the resulting image presents depth and congruency to a viewer's coordinate space.

2. The method of claim 1 wherein geometrically altering each of the images includes removing convergence from each of the images.

3. The method of claim 1 wherein geometrically altering each of the images includes removing parallax skew from each of the pair of images.

4. The method of claim 1 wherein geometrically altering each of the images includes removing foreshortening from each of the images.

5. The method of claim 1 wherein geometrically altering each of the images includes projective mapping.

6. The method of claim 1 wherein graphics software is used to geometrically alter each of the images.

7. The method of claim 1 wherein the set of images is created by a camera.

8. The method of claim 7 wherein a non-digital set of images is digitized.

9. The method of claim 1 wherein the set of images is created by a computer graphics program.

10. The method of claim 1 wherein the set of images is created by a microscope.

11. The method of claim 1 wherein the selected plane of each of the images is selected from a group consisting of:
   a) the X-Z plane;
   b) the Y-Z plane;
   c) the X-Y plane;
   d) a diagonal combination of any of the planes.

12. The method at claim 1 wherein the viewing technique includes anaglyphic and polarized printing and projection.

13. The method of claim 1 wherein the viewing technique includes vectography.

14. The method of claim 1 wherein the viewing technique includes opaque projection.

15. The method of claim 1 wherein the viewing technique includes CRT.

16. The method of claim 1 wherein the viewing technique includes holography.

17. The method of claim 1 wherein the viewing technique includes lenticular stereography.

18. A method of creating a stereoscopic image comprising:
   a) creating a digitized set of at least two images;
   b) geometrically altering each of the images such that a selected plane in each of the images is restored, wherein said alteration includes at least one of a group consisting of:
      i) removing convergence from each image;
      ii) removing parallax skew from each image;
      iii) removing foreshortening from each image;
      iv) projective mapping; and
   d) presenting the stereoscopic image wherein the selected plane of each image of the set is coincident with the ground plane.

19. The method of claim 18 wherein the set of images is created by a camera.

20. The method of claim 19 wherein a non-digital set of images is digitized.

21. The method of claim 18 wherein the set of images is created by a computer graphics program.

22. The method of claim 18 wherein the set of images is created by geometric construction.

23. The method of claim 18 wherein the set of images is created by a microscope.

24. The method of claim 18 wherein the selected plane of each of the images is selected from a group consisting of:
   a) the X-Z plane;
   b) the Y-Z plane;
   c) the X-Y plane; or
   d) a diagonal combination of any of the planes.

25. The method of claim 18 further including viewing the stereoscopic image using anaglyphic polarized printing and projection.

26. The method of claim 18 further including viewing the stereoscopic image using vectography.

27. The method oh claim 18 further including viewing the stereoscopic image using opaque projection.

28. The method of claim 18 further including viewing the stereoscopic image using CRT.

29. The method of claim 18 further including viewing the stereoscopic image using holography.

30. The method of claim 18 further including viewing the stereoscopic image using lenticular stereoscopy.

* * * * *